July 16, 1940.  H. M. LUCAS ET AL  2,208,312
HORIZONTAL BORING MACHINE
Filed Feb. 3, 1939  3 Sheets-Sheet 2
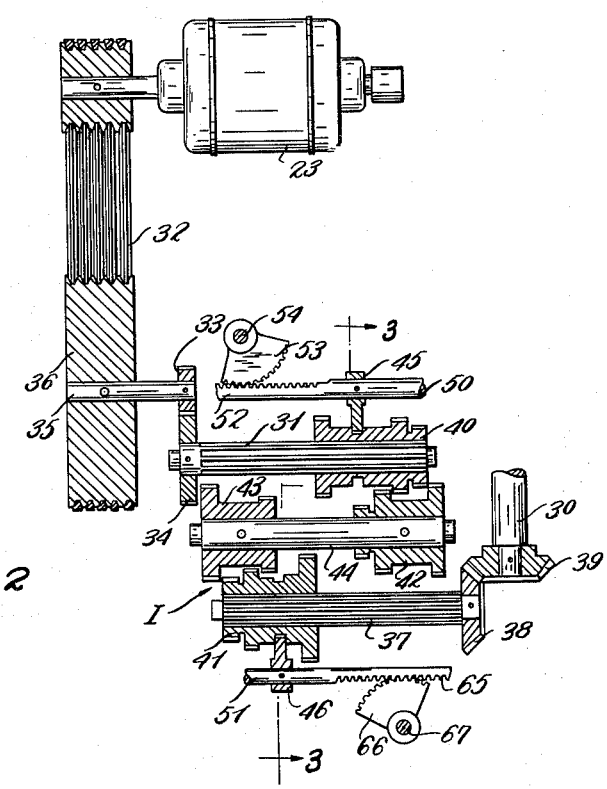
Fig.2
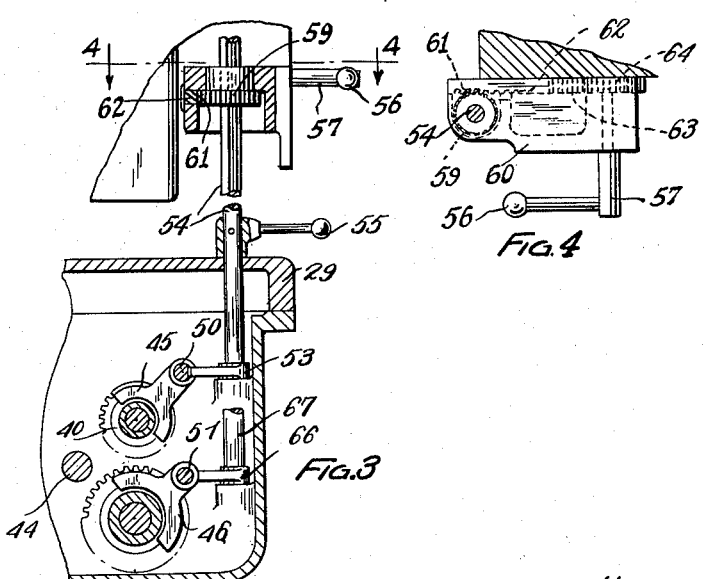
Fig.4
Fig.3
INVENTORS
HENRY M. LUCAS
HALLIS N. STEPHAN
BY Kwis Hudson & Kent
ATTORNEYS July 16, 1940.   H. M. LUCAS ET AL   2,208,312
HORIZONTAL BORING MACHINE
Filed Feb. 3, 1939   3 Sheets-Sheet 3

INVENTORS
HENRY M. LUCAS
HALLIS N. STEPHAN
BY Kwis Hudson & Kent
ATTORNEYS

Patented July 16, 1940

2,208,312

UNITED STATES PATENT OFFICE 2,208,312

HORIZONTAL BORING MACHINE

Henry M. Lucas and Hallis N. Stephan, Cleveland Heights, Ohio, assignors to The Lucas Machine Tool Company, Bratenahl, Ohio, a partnership composed of Henry M. Lucas, George A. Yost, and John A. Leighton Application February 3, 1939, Serial No. 254,437

8 Claims. (Cl. 29—26)

The present invention relates to metal working machines and more particularly to horizontal boring and milling machines.

The present-day high-speed cutting tools require a wider range of and higher spindle speeds to obtain full production from machine tools such as horizontal boring and milling machines and the principal object of the present invention is the provision of a simple, novel drive for the spindle of the horizontal boring machine, which drive will give a large range of spindle speeds and which can be easily manipulated to obtain the desired speed.

Another object of the present invention is the provision of a novel horizontal boring and milling machine provided with a spindle drive comprising a single gear cluster located in the spindle head and shiftable into different positions drives the spindle at a high rate of speed through a flexible drive connection.

The present invention resides in certain novel details of construction, and combinations and arrangements of parts, and further objects and advantages thereof will be apparent to those skilled in the art to which the invention relates from the following description of the preferred embodiment thereof described with reference to the accompanying drawings, in which similar reference characters designate corresponding parts throughout the several views and in which, Fig. 1 is a perspective view of a horizontal boring and milling machine embodying the present invention;

Fig. 2 is a developed view of that portion of the spindle drive which is located in the base of the machine;

Fig. 3 is a vertical sectional view with portions shown in elevation, taken approximately on the line 3—3 of Fig. 2;

Fig. 4 is a sectional view taken approximately on the line 4—4 of Fig. 3;

Figure 1:
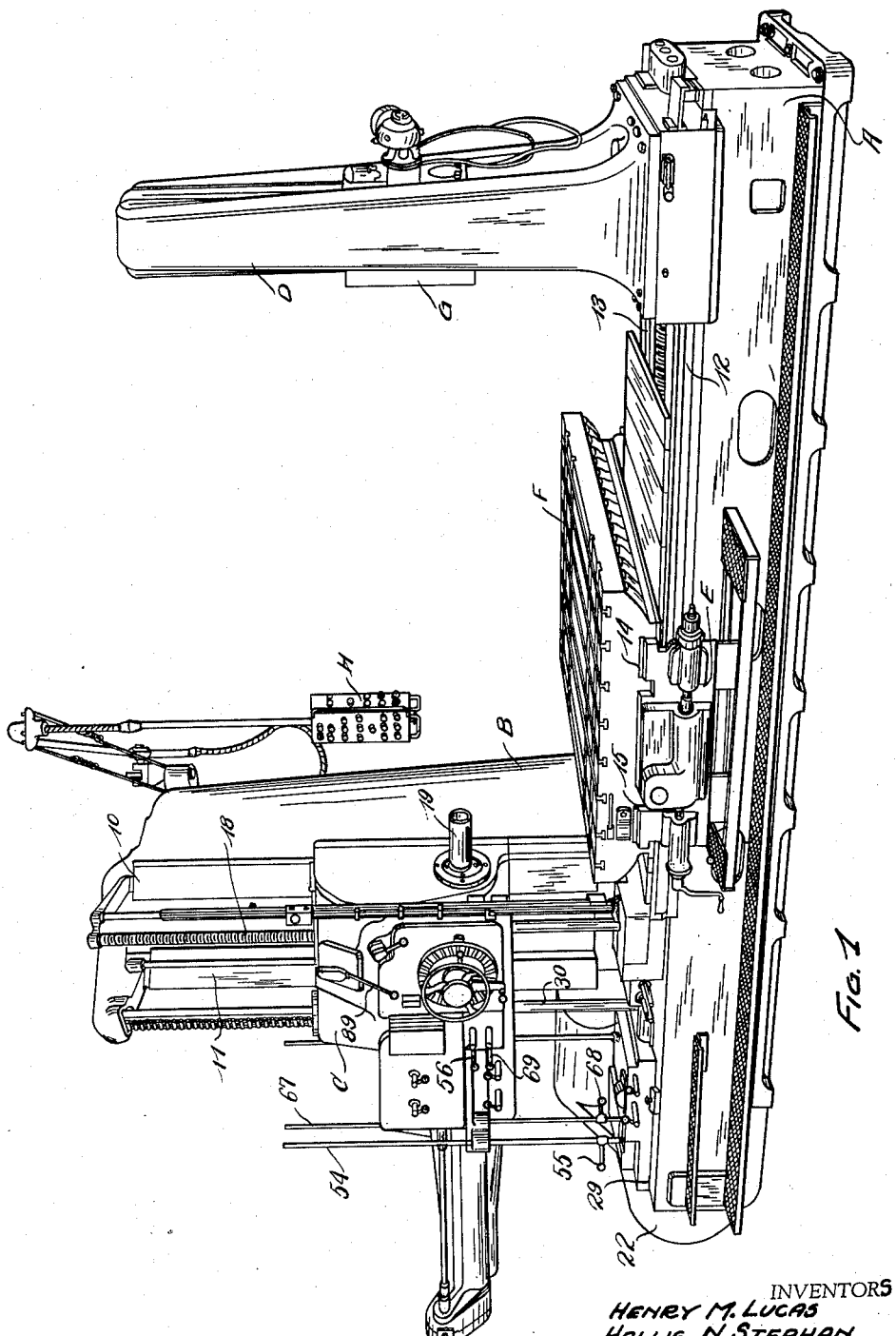
Figure 5:
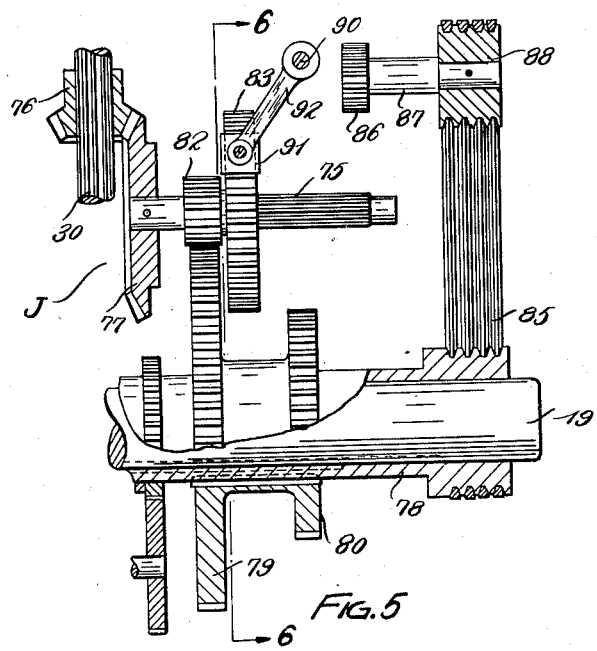
Fig. 5 is a developed view of that portion of the spindle drive which is located in the spindle head of the machine.
Figure 6:
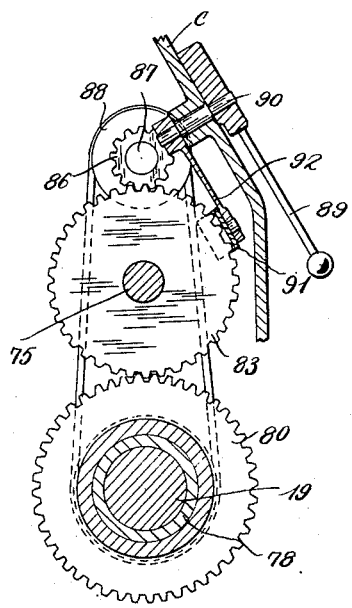
Fig. 6 is a vertical sectional view, with portions shown in elevation, through a portion of the spindle head, approximately on the line 6—6 of Fig. 5.

Referring to the drawings, the machine shown therein comprises a base A provided at one end with a spindle head column B having vertical ways 10 and 11 on the front face thereof, upon which ways a spindle head C is mounted for vertical movement. At the other end of the base or bed A, a backrest or outboard support column D is provided. This backrest or outboard support column is slidably supported on horizontal ways 12 and 13 formed on the upper side of the bed. The ways 12 and 13 also have slidably supported thereon a saddle E, the upper side of which is provided with horizontal ways 14 and 15 which in turn support a work table F. A backrest block G is slidably supported for movement along vertical ways formed on the backrest column.

The spindle head C which is counterbalanced by a weight (not shown) is adapted to be moved vertically along the ways 10 and 11 by a lead screw 18 rotatably supported in the base A and the spindle head column B and having threaded engagement with a nut fixed in the spindle head. The spindle designated generally by the reference character 19, in addition to being rotatable in opposite directions in a manner hereinafter more specifically referred to, is moved in opposite directions longitudinally of its axis to effect both feeding and rapid traversing movements. The machine shown is similar to that disclosed in our copending application Serial No. 243,616, entitled "Boring machine" and the various operations and movements of the different elements of the machine are controlled from a pendant controlled station H described and claimed in said application. This mechanism per se forms no part of the present invention and will not be described in detail.

According to the provisions of the present invention, the spindle 19 is adapted to be rotated from a reversible main driving motor 23 arranged for sealing mounting and enclosed within a guard 22 adjacent to the left-hand end of the machine through the medium of speed change gearing designated generally by the reference character I housed within a suitable gear box 29 supported in the bed of the machine; a vertical shaft 30, the lower end of which is rotatably supported in the gear box 29 while the upper end is supported in the head column B; and back gears designated generally by the reference character J located in the spindle head C.

The motor 23 is connected to the driven shaft 31 of the speed change transmission I by a V-belt drive 32 and spur gears 33 and 34, the former of which is fixed to a shaft 35 which carries the driven pulley 36 of the V-belt drive 32 while the latter is fixed to the shaft 31. The driving shaft 37 of the transmission I is connected to the lower end of the vertical shaft 30 by miter gears 38 and 39. The speed change transmission I provides nine different speeds and comprises gear clusters 40 and 41 slidably supported on the splined shafts 31 and 37, respectively, and adapted to engage gear clusters 42 and 43 fixed to an intermediate shaft 44.

The gear clusters 40 and 41 are adapted to be shifted lengthwise of the splined shafts 31 and 37 upon which they are slidably splined to obtain the various speeds by yoke members 45 and 46 carried by slidable rods 50 and 51, respectively. The rod 50 is slidably supported in the gear box 29 in a suitable manner and has a rack 52 formed thereon which is continuously in mesh with a gear sector 53 fixed adjacent to the lower end of a vertical shaft 54 projecting upwardly from the gear box and extending through the spindle head. Immediately above the gear box 29 the shaft 54 is provided with a hand lever 55 through the medium of which the gear cluster 40 may be manually moved. The shaft 54 can also be manually rotated from a hand lever 56 fixed to a short shaft 57 journaled in the spindle head C, and operatively connected to the shaft 54 through the medium of a gear 59 rotatably supported in a member 60 fixed to the face of the spindle head. The gear 59 is splined on the shaft 54 and in mesh with a rack 61 formed on the front face of a slidable bar 62 suitably supported in the member 60. The upper side of the bar 62 is provided with a similar rack 63 continuously in mesh with a gear 64 fixed to the rear end of the shaft 57, the front end of which shaft carries the hand lever 56, previously referred to. The slidable rod 51 which carries the yoke 46 has rack teeth 65 formed thereon which mesh with a gear sector 66 fixed to the lower end of a vertical shaft 67 similar to the shaft 54 previously referred to. The shaft 67 is adapted to be manually rotated in either direction to shift the gear cluster 41 by hand levers 68 and 69 located just above the gear box 29 and on the spindle head, respectively, and operatively connected to the shaft 67 in a manner similar to that in which the levers 55 and 56, with which they correspond, are operatively connected with the shaft 54. The construction is such that either the gear cluster 40 or the gear cluster 41 can be manually shifted by the levers 55 and 68 adjacent to the gear box or by the levers 56 and 69 on the spindle head C.

The driven shaft 75 of the back gears J is rotatably supported in the spindle head C and is connected to the upper end of the vertical shaft 30 by a bevel gear 76 carried by the spindle head and splined to the shaft 30. The bevel gear 76 meshes with a bevel gear 77 fixed to the left-hand end of the shaft 75. The spindle 19 is slidably keyed within a spindle quill 78 rotatably supported by suitable bearings in the spindle head C, which spindle quill has a gear cluster comprising the gears 79 and 80 fixed thereto. The gears 79 and 80 are adapted to be selectively engaged by gears 82 and 83, respectively, of a gear cluster splined to the shaft 75. When the gear 79 is in mesh with the gear 82 and the motor 23 operated, the spindle is rotated at a comparatively slow speed. A higher speed is obtained by meshing the gear 80 with the gear 83 and a still higher speed is obtainable through the medium of a V-belt final drive 85 when the gear 83 is shifted into engagement with a gear 86 fixed to a short shaft 87 journaled in the spindle head, which shaft carries the driving pulley 88 of the V-belt drive 85. The gear cluster comprising the gears 82 and 83 is adapted to be shifted along the shaft 75 by a hand lever 89 fixed to the front end of a horizontal shaft 90 journaled in the spindle head, the rear end of which shaft carries a yoke member 91 secured to the end of an arm 92, which yoke member engages over the large gear 83 of the shiftable gear cluster.

In the present construction, the principal change speed gearing is located in the base of the machine rather than in the head, thus reducing the weight of the spindle head. However, a number of speeds can be obtained by shifting the gear cluster comprising the gears 82 and 83 located in the spindle head. The construction of the back gears J is such that only one of the three speeds obtainable thereby can be engaged at any one time. Through the medium of the back gears, the spindle may be rotated either at a comparatively low speed through a direct gear drive or at a comparatively high speed through the flexible driving connection, which flexible driving connection has decided advantages over a gear drive at high speeds. Shock is particularly detrimental to high speed cutting tools and the flexible driving connection which operates in connection with the high spindle speeds absorbs any shocks which might occur, thus increasing the life of the tools, etc.

The present construction also permits the use of large diameter gears on the spindle quill. Ordinarily it is desirable to have the larger of the two gears on the spindle quill, that is, gear 79 in the preferred embodiment of the invention shown of greater diameter than the largest milling cutter intended to be used on the machine as this gives a much steadier drive in addition to having other advantages. With the present construction high spindle speeds are possible without high gear tooth speeds which is also very desirable.

From the foregoing description of the preferred embodiment of the invention, it will be apparent that the objects of the invention heretofore enumerated and others have been accomplished and that a simple, novel drive for a tool spindle has been provided, including change gears readily shiftable at convenient places about the machine to obtain various speeds. While the preferred embodiment of the invention has been described with considerable detail, we do not wish to be limited to the particular construction shown which may be varied within the scope of this invention and having described our invention, we particularly point out and claim the following:

1. A spindle head for a machine tool of the character described, said spindle head comprising a frame, a spindle rotatably supported in said frame, a first shaft rotatably supported in said frame, a second shaft rotatably supported in said frame, means for driving said first shaft, a plurality of gears on said first shaft, a plurality of gears connected to said spindle, a gear on said second shaft, means for selectively operatively connecting different gears on said first shaft and said spindle and one of the gears on said first shaft with said gear on said second shaft, and a flexible driving connection for operatively connecting said spindle and said second shaft.

2. A spindle head for a machine tool of the character described, said spindle head comprising a frame, a spindle rotatably supported in said frame, a splined shaft rotatably supported in said frame, a second shaft rotatably supported in said frame, means for driving said splined shaft, a plurality of gears slidably supported on said splined shaft, a plurality of gears connected to said spindle, a gear on said second shaft, means for selectively engaging different gears on said splined shaft and said spindle and one of the gears on said splined shaft with said gear on said second shaft, and a flexible driving connection for operatively connecting said spindle and said second shaft.

3. A spindle head for a machine tool of the character described, said spindle head comprising a frame, a spindle rotatably supported in said frame, a splined shaft rotatably supported in said frame, a second shaft rotatably supported in said frame, means for driving said splined shaft, a gear cluster slidably supported on said splined shaft, a gear cluster connected to said spindle, a gear on said second shaft, means for selectively engaging the gears of the gear cluster on said splined shaft with the gears of the gear cluster connected to said spindle and one of the gears of said gear cluster on said splined shaft with said gear on said second shaft, and a flexible driving connection for operatively connecting said spindle and said second shaft.

4. A spindle head for a machine tool of the character described, said spindle head comprising a frame, a spindle rotatably supported in said frame, a splined shaft rotatably supported in said frame, a second shaft rotatably supported in said frame, means for driving said splined shaft, a gear cluster slidably supported on said splined shaft, a gear cluster connected to said spindle, a gear on said second shaft, a lever pivotally supported in said frame and operatively connected to said gear cluster on said splined shaft for selectively engaging the gears of said gear cluster on said splined shaft with the gears of said gear cluster connected to said spindle and one of said gears of said gear cluster on said splined shaft with said gear on said second shaft, and a flexible driving connection encircling said spindle for operatively connecting said spindle and said second shaft.

5. In a horizontal boring machine of the character described, the combination of a frame including a bed and a spindle head column, said spindle head column having vertical ways thereon, a spindle head supported for vertical movement along said ways, a spindle rotatably supported in said spindle head, an electric motor supported in said bed for rotating said spindle, a speed change transmission located in said bed, means for operatively connecting said electric motor to the driven shaft of said speed change transmission, means for operatively connecting the driving shaft of said speed change transmission to said spindle, means located adjacent to said bed for selectively engaging different gears of said speed change transmission, and means located at said spindle head for selectively engaging different gears of said speed change transmission.

6. In a horizontal boring machine of the character described, the combination of a frame including a bed and a spindle head column, said spindle head column having vertical ways thereon, a spindle head supported for vertical movement along said ways, a spindle rotatably supported in said spindle head, a first shaft rotatably supported in said spindle head, an electric motor supported in said bed for rotating said spindle, a speed change transmission located in said bed, means for operatively connecting said electric motor to the driven shaft of said speed change transmission, means for operatively connecting the driving shaft of said transmission and said first shaft, a second shaft rotatably supported in the spindle head, a plurality of gears on said first shaft, a plurality of gears connected to said spindle, a gear on said second shaft, means for selectively operatively connecting different gears on said first shaft and said spindle and one of said gears on said first shaft and said gear on said second shaft, and a flexible driving connection for operatively connecting said spindle and said second shaft.

7. In a horizontal boring machine of the character described, the combination of a frame including a bed and a spindle head column, said spindle head column having vertical ways thereon, a spindle head supported for vertical movement along said ways, a spindle rotatably supported in said spindle head, a splined shaft rotatably supported in said spindle head, an electric motor supported in said bed for rotating said spindle, a change speed transmission located in said bed, means for operatively connecting said electric motor to the driven shaft of said change speed transmission, means for operatively connecting the driving shaft of said transmission and said splined shaft, a second shaft rotatably supported in the spindle head, a plurality of gears slidably supported on said splined shaft, a plurality of gears connected to said spindle, a gear on said second shaft, means for selectively engaging different gears on said splined shaft and said spindle and one of said gears on said splined shaft and said gear on said second shaft, and a flexible driving connection for operatively connecting said spindle and second shaft.

8. In a horizontal boring machine of the character described, the combination of a frame including a bed and a spindle head column, said spindle head column having vertical ways thereon, a spindle head supported for vertical movement along said ways, a spindle rotatably supported in said spindle head, a splined shaft rotatably supported in said spindle head, an electric motor supported in said bed for rotating said spindle, a change speed transmission located in said bed, means for operatively connecting said electric motor to the driven shaft of said change speed transmission, means for operatively connecting the driving shaft of said transmission and said splined shaft, a second shaft rotatably supported in the spindle head, a gear cluster splined on said splined shaft, a gear cluster connected to said spindle, a gear on said second shaft, a lever pivotally supported on said spindle head and operatively connected to said gear cluster on said splined shaft for selectively engaging the gears of said gear cluster on said splined shaft with the gears of said gear cluster connected to said spindle and one of said gears of said gear cluster on said splined shaft with said gear on said second shaft, and a flexible driving connection encircling said spindle for operatively connecting said spindle and said second shaft.

HENRY M. LUCAS.
HALLIS N. STEPHAN.